United States Patent
Moore et al.

(10) Patent No.: US 6,778,974 B2
(45) Date of Patent: Aug. 17, 2004

(54) MEMORY DEVICE AND METHOD FOR READING DATA STORED IN A PORTION OF A MEMORY DEVICE UNREADABLE BY A FILE SYSTEM OF A HOST DEVICE

(75) Inventors: Christopher S. Moore, San Jose, CA (US); Roger W. March, Santa Clara, CA (US); Daniel T. Brown, Seattle, WA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 426 days.

(21) Appl. No.: 09/775,939

(22) Filed: Feb. 2, 2001

(65) Prior Publication Data

US 2002/0107862 A1 Aug. 8, 2002

(51) Int. Cl.[7] .......................... G06F 17/30; G06F 12/00
(52) U.S. Cl. .......................... 707/1; 711/100; 711/101; 711/147; 711/163
(58) Field of Search .......................... 707/1–2, 101, 707/205, 7; 711/1–4, 100–105, 111, 113–114, 129–130, 147, 202

(56) References Cited

U.S. PATENT DOCUMENTS

| | | | |
|---|---|---|---|
| 4,646,266 A | | 2/1987 | Ovshinsky et al. |
| 4,740,890 A | | 4/1988 | William |
| 5,119,291 A | | 6/1992 | Flannagan et al. |
| 5,307,497 A | * | 4/1994 | Feigenbaum et al. .......... 713/1 |
| 5,321,824 A | | 6/1994 | Burke et al. |
| 5,437,028 A | | 7/1995 | Iijima |
| 5,448,728 A | | 9/1995 | Takano et al. |
| 5,463,772 A | | 10/1995 | Thompson et al. |
| 5,559,778 A | | 9/1996 | Inokuchi et al. |
| 5,752,005 A | | 5/1998 | Jones |
| 5,761,741 A | | 6/1998 | Robbins et al. |
| 5,835,396 A | | 11/1998 | Zhang |
| 5,890,169 A | | 3/1999 | Wong et al. |
| 6,000,023 A | | 12/1999 | Jeon |
| 6,034,882 A | | 3/2000 | Johnson et al. |
| 6,236,587 B1 | | 5/2001 | Gudesen et al. |
| 6,351,838 B1 | * | 2/2002 | Amelia ....................... 714/770 |
| 6,694,415 B2 | * | 2/2004 | March et al. ................ 711/163 |
| 2002/0034105 A1 | | 3/2002 | Kulkarni et al. |

FOREIGN PATENT DOCUMENTS

| | | |
|---|---|---|
| EP | 1 168 150 A1 | 2/2002 |
| WO | WO 99/14763 | 8/1998 |

OTHER PUBLICATIONS

"New Direct CD 2.5 Improves Speed and Reliability of Data Archiving Using CD–R/CD–RW," http://www.adaptec.com/worl . . . pany/pressrelease.html?prodkey=08051998, 2 pages, Aug. 5, 1998.

(List continued on next page.)

*Primary Examiner*—Alford Kindred
(74) *Attorney, Agent, or Firm*—Brinks Hofer Gilson & Lione (57) ABSTRACT

The preferred embodiments described herein provide a memory device and method for reading data stored in a portion of a memory device unreadable by a file system of a host device. In one preferred embodiment, a memory device is provided comprising a first portion that is readable by a file system of a host device and a second portion that is unreadable by the file system of the host device. The first portion stores program code operative to enable the host device to read the second portion. In operation, after the memory device is connected with the host device, the program code is provided to the host device, and the host device reads the data stored in the second portion of the memory device. Other preferred embodiments are provided, and each of the preferred embodiments described herein can be used alone or in combination with one another.

22 Claims, 2 Drawing Sheets

OTHER PUBLICATIONS

"Universal Disk Format (UDF) Driver," http://www.trylinux.com/projects/udf/index.html, 3 pages (1999).
"FAT File Allocation Table," http://www.easydesksoftware.com/fat.htm, 2 pages, Oct. 24, 1999.
"FAT File Allocation Table," http://www.oreilly.com/reference/directory/terms/F/File Allocation Table.htm, 4 pages (1996).
"ISO9960 Simplified for DOS/Windows by Philip J. Erdelsky," http://www.alumni.caltech.edu/~pje/iso9660.html, 8 pages Aug. 26, 2000.
"Memory cards: designing with a full deck," http://www.ednmag.com/ednmag/reg/2000/052520000/11dfl.htm, 12 pages, May 25, 2000.
"DOS Disk Formats," http://www.qvctc.commnet.edu/classes/csc277/formats.html, 7 pages (1999).
"MS-DOS Partitioning Summary," http://www.qvctc.commnet.edu/classes/csc277/fdisk2.html, 3 pages (1999).
"DOS Partitions," http://www.qvctc.commnet.edu/classes/csc277/partitions.html, 5 pages (1999).
"DOS Disk Structures-Definitions," http://www.qvctc.commnet.edu/classes/csc277/formats2.html, 3 pages (1999).
"MS-DOS Summary A Survival Guide," http://www.washtenaw.cc.mi.us/dept/cis/mod/q02cd.htm, 10 pages (1996).
"Hardware White Paper, FAT: General Overview of On-Disk Format," Microsoft Corp., 25 pages, May 5, 1999.
"Method for Deleting Stored Digital Data from Write-Once Memory Device," U.S. patent application Ser. No. 09/638,439, filed Aug. 14, 2000; inventors: Christopher S. Moore, Derek J. Bosch, Daniel C. Steere, and J. James Tringali.
"Method for Storing Digital Information in Write-Once Memory Array," U.S. patent application Ser. No. 09/727,229, filed Nov. 30, 2000; inventors: David R. Friedman Derek J. Bosch, Christopher S. Moore, J. James Tringali, and Michael A. Vyyoda.
"Three-Dimensional Memory Array and Method of Fabrication," U.S. patent application Ser. No. 09/560,626, filed Apr. 28, 2000; inventor: Johan Knall.
"Write-Once Memory Array Controller, System, and Method," U.S. patent application Ser. No. 09/638,427, filed Aug. 14, 2000; inventors: Derek J. Bosch, Christopher S. Moore, Daniel C. Steere, and J. James Tringali.
"Low-Cost Three-Dimensional Memory Array," U.S. patent application Ser. No. 09/638,428, filed Aug. 14, 2000; inventors: Mark G. Johnson, Thomas H. Lee, Vivek Subramanian, and P. Michael Farmwald.
"Modular Memory Device," U.S. patent application Ser. No. 09/638,334, filed Aug. 14, 2000; inventors: J. James Tringali, P. Michael Farmwald, Thomas H. Lee, Mark G. Johnson, and Derek J. Bosch.
"The MS-DOS Filesystem," http://www.cs.adfa.oz.au/teaching/studinfo/osrts/Lectures/node113.html, 2 pages Mar. 1, 2001.
"comp.os.ms-windows.programmer.vxd Frequently Asked Questions (FAQ)," http://www.faqs.org/faqs/windows/programming/vxd/, 16 pages (1995).
"CD-ROM Driver Installation Procedure," http://www.pcguide.com/proc/setup/cddriver-c.html, 3 pages, Apr. 17, 2001.
"Fujifilm News & Events, Medical Imaging Science Systems NDT Systems," http://www.fujimed.com/news/news openarch.html, 2 pages, Nov. 26, 2000.
"CNN.com DVD Encryption hacked," http://www.cnn.com/TECH/computing/9911/05/dvd.hack.idg/, 3 pages, Nov. 5, 1999.
"Octopus Systems, Acorn's Solution for the Java™ Technology Platform," http://www.octosys.co.uk/java.html, 9 pages (2001).
"Content Protection System Architecture, A Comprehensive Framework for Content Protection Intel Corp.," 19 pages, Feb. 17, 2000.
"Media security thwarts temptation, permits prosecution," http://www.ednmag.com/ednmag/reg/2000/06222000/13tt.htm, 13 pages, Jun. 22, 2000.
"Memory Devices and Methods for Use Therewith," U.S. patent application Ser. No. 09/748,589, filed Dec. 22, 2000; inventors: Roger W. March, Christopher S. Moore, Daniel Brown, Thomas H. Lee, and Mark H. Johnson.
"Chapter 32—Disk Concepts and Troubleshooting," Microsoft Windows 2000 Professional Resource Kit, Microsoft Corporation, 29 pages, Mar. 15, 2000.
NN8803151, IBM Technical Disclosure Bulletin, "Incremental Directory Indexes for Write-Once Media", Mar., 1988, vol. 30, Issue 10, pp. 151-155.

* cited by examiner

MEMORY DEVICE AND METHOD FOR READING DATA STORED IN A PORTION OF A MEMORY DEVICE UNREADABLE BY A FILE SYSTEM OF A HOST DEVICE

BACKGROUND

Modular, portable, non-volatile memory devices are available that can be readily connected to and disconnected from host devices such as digital cameras, digital audio recorders, and personal computers. Even though the memory device and the host device are physically compatible, the memory device may not be readable by the file system of the host device if the memory device is configured with a different file system. For example, a user who uses a non-DOS FAT file system to store digital pictures from a digital camera onto a memory device may not be able to read the pictures if the memory device is connected to a personal computer configured to only use the DOS FAT file system. Some systems allow multiple files systems to be used, in which case the user can install the memory device's file system onto the computer. In operation, the user would insert a separate memory device with the new file system, manually install the new file system, re-boot the computer, insert the memory device into the computer, and then read the pictures from the memory device. Manually installing a new file system can be difficult for users who are unfamiliar with computers. Further, a user may not have the separate memory device with the required file system at the time he wishes to view the pictures on his computer.

There is a need, therefore, for an improved memory device and method for reading data stored therein.

SUMMARY

The present invention is defined by the following claims, and nothing in this section should be taken as a limitation on those claims.

By way of introduction, the preferred embodiments described below provide a memory device and method for reading data stored in a portion of a memory device unreadable by a file system of a host device. In one preferred embodiment, a memory device is provided comprising a first portion that is readable by a file system of a host device and a second portion that is unreadable by the file system of the host device. The first portion stores program code operative to enable the host device to read the second portion. In operation, after the memory device is connected with the host device, the program code is provided to the host device, and the host device reads the data stored in the second portion of the memory device. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
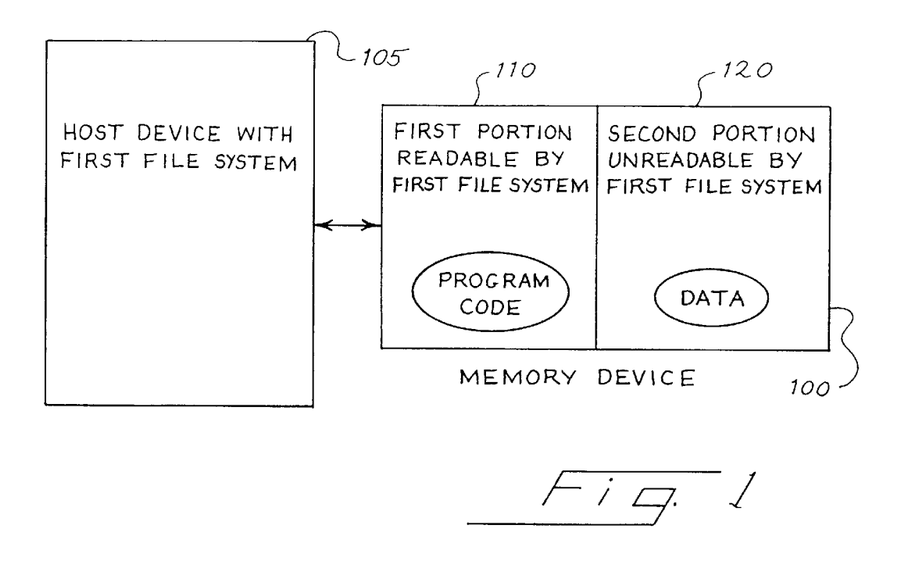
FIG. 1 is an illustration of a memory device and a host device of a preferred embodiment.

Turning now to the drawings, FIG. 1 is an illustration of a memory device 100 and a host device 105 of a preferred embodiment. As used herein, the term "host device" is intended to refer to any device that can be provided with a memory device and can be used to read data from the memory device. A host device can take any suitable form including, but not limited to, a digital camera, a digital audio player, an electronic book, a personal digital assistant, a game player, a mobile telephone, and a general-purpose programmable computer (e.g., a personal computer (PC)). "Data" is intended to broadly refer to any type of digital data that can be read from a memory device with a host device. Examples of data include, but are not limited to, still pictures (photographs), music, audio in general, books, text in general, maps, sequences of images, and video in general. Also as used herein, the term "memory device" broadly refers to any suitable storage medium for storing digital data. Examples of memory devices include, but are not limited to, a re-writeable or write-once three-dimensional semiconductor memory array, an optical storage device (such as a compact disc), and a magnetic storage device (such as a floppy disk). In one preferred embodiment, the memory device takes the form of a modular, hand-held unit (such as a card or a stick) that is readily connected with and removable from a host device. In such an embodiment, the memory device and the host device can each comprise respective exposed electrical connectors. The memory device is provided to the host device by connecting the exposed electrical connector of the memory device with the exposed electrical connector of the host device. In this way, the memory device can be readily inserted into and removed from the host device and replaced with another memory device.

As shown in FIG. 1, host device 105 operates with a first file system that is used to control where data is stored and read from a memory device. The memory device 100 comprises a first portion 110 readable by the first file system and a second portion 120 unreadable by the first file system. The first portion 110 stores program code, and the second portion 120 stores data. While only two portions 110, 120 are shown in FIG. 1, the memory device 100 can comprise additional portions. Also, the two portions 110, 120 can be in a single partition in the memory device 100, or the two portions 110, 120 can be located in separate partitions. A partition can comprise a set of memory cells with a single addressing scheme. Further, the first portion 110 and/or the second portion 120 can be fixed or updateable. In this embodiment, the second portion 120 is readable by a second file system that is not installed in the host device 105 prior to the host device 105 being provided with the memory device 100. For example, the first file system can be a DOS-FAT file system, and the second portion 120 can be readable by a second file system, such as ISO-9660, Universal Disk Format (UDF), or a file system for a memory device having a three-dimensional array of write-once semiconductor memory cells, as described in U.S. patent application Ser. No. 09/748,589, which is assigned to the assignee of the present invention and is hereby incorporated by reference.

Figure 2:
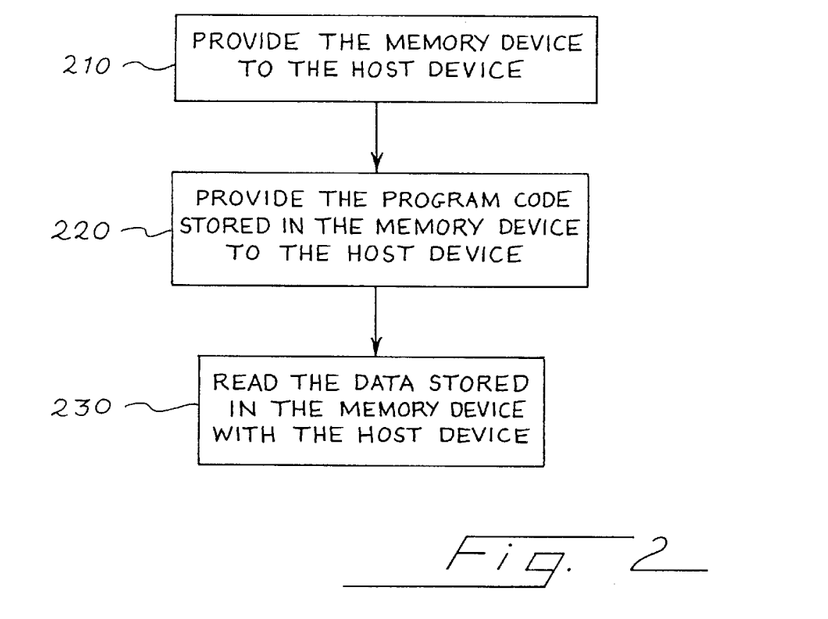
FIG. 2 is a flow chart of a method of a preferred embodiment for reading data stored in a portion of a memory device unreadable by a file system of a host device.

One preferred method for reading data stored in the second portion 120 of the memory device 100 is illustrated in the flow chart of FIG. 2. As shown in FIG. 2, the memory device 100 is first provided to the host device 105 (act 210). The memory device 100 can be "provided" to the host device 105 in any suitable manner. For example, if the memory device 100 and the host device 105 each comprise respective exposed electrical connectors, the memory device 100 can be provided to the host device 105 by connecting the exposed electrical connector of the memory device 100 with the exposed electrical connector of the host device 105. As used herein, the term "connected with" means directly connected with or indirectly connected with through one or more named or unnamed components. As another example, if the memory device 100 takes the form of a compact disc, the memory device 100 can be provided to the host device 105 by loading the compact disc onto a tray of a compact disc drive of the host device 105. Further, if the memory device 100 takes the form of a floppy disk, the memory device 100 can be provided to the host device 105 by inserting the floppy disk into a disk drive of the host device 105.

After the memory device 100 is provided to the host device, the program code 110 stored in the memory device 100 is provided to the host device 105 (act 220). The program code stored in the first portion 110 is operative to enable the host device 105 to read the second portion 120 and, accordingly, read the data stored in the second portion 120. The program code can take any suitable form and be written in any suitable programming language. For example, the program code can be an executable program that dynamically installs the second file system onto the host device 105. With the second file system installed onto the host device 105, any application running on the host device 105 can read the second portion 120. The program code can also be a driver that intercepts file operations or enhances a user interface (e.g. Windows Explorer from Microsoft Corporation) to provide access to the data stored in the second portion 120. In another embodiment, the program code is an application, such as an image viewer, a calendaring tool, a word processor, or a game. In this embodiment, only the application loaded from the memory device 100 can read the second portion 120. In yet another embodiment, the program code 110 is an extension to an application (e.g., an image viewer, a calendaring tool, a word processor, or a game) already installed on the host device 105. The extension would allow that particular existing application, but not other applications, to read the data stored in the second portion 120 of the memory device 100. The program code can also enable the host device 105 to write data to—not just read data from—the second portion 120 of the memory device 100.

As the above examples illustrate, the phrase "enabling the host device to read the second portion" can take different meanings depending on the form of the program code. For example, "enabling the host device to read the second portion" can mean enabling every application on the host device 105 to read the second portion 120, enabling a subset of applications on the host device 105 to read the second portion 120, or providing the host device 105 with an application that itself can read the second portion 120. With the program code 110 provided to the host device 105, the host device 105 can read the second portion 120 and, accordingly, the data stored in the second portion 120 of the memory device 100 (act 230). As stated above, the host device 105 reads the second portion 120 when at least one application of the host device 105 reads the second portion 120.

In one preferred embodiment, the program code is automatically provided to the host device 105 and enables the host device 105 to read the second portion 120 of the memory device 100 without requiring the host device 105 be rebooted. This results in a seamless operation from the perspective of the user of host device 105. For example, consider the situation in which a user uses a digital camera to take and store digital pictures onto a write-once three dimensional semiconductor memory device with a file system developed specially for that type of memory device. When the user removes the memory device from his camera and connects it to his personal computer, the file system of the personal computer can read the first portion storing the program code but not the second portion storing the digital pictures. With this preferred embodiment, the program code is automatically provided to the personal computer after the memory device is connected to the computer and enables the computer to read the digital pictures stored in the second portion of the memory device. Because the program code is dynamically installed onto the computer, the user does not manually install the program code. This may be especially beneficial for users, such as casual camera users, who might find it difficult to manually install the program code. Further, since the user is not required to take any action such as rebooting the computer, the user is unaware that any steps were taken to enable the computer to read the pictures. The operation is also seamless to the user in that the program code needed for the host device to read the second portion is stored on the same memory device as the second portion. Because the program code is "tied" the second portion (and the data stored therein), the user does not need to provide a separate memory device with the program code (or an upgrade to existing program code) to view the pictures on his computer. As illustrated by this example, the use of these preferred embodiments provides portability to memory devices that store data using a file system that is not a standard file system used by a host device.

The following example illustrates the operation of one preferred embodiment. It is important to note that none of the details set forth in this example should be read into the claims unless they are explicitly recited therein. In this example, the host device takes the form of a personal computer installed with the Windows 98 operating system by Microsoft Corporation and operating with the DOS FAT file system. The memory device is a modular, portable memory device comprising a three-dimensional array of write-once semiconductor memory cells formatted with the file system described in U.S. patent application Ser. No. 09/748,589, which is assigned to the assignee of the present invention and is hereby incorporated by reference. Also, in this embodiment, the program code takes the form of a three-dimensional memory device file system.

Figures 3, 4, 5:
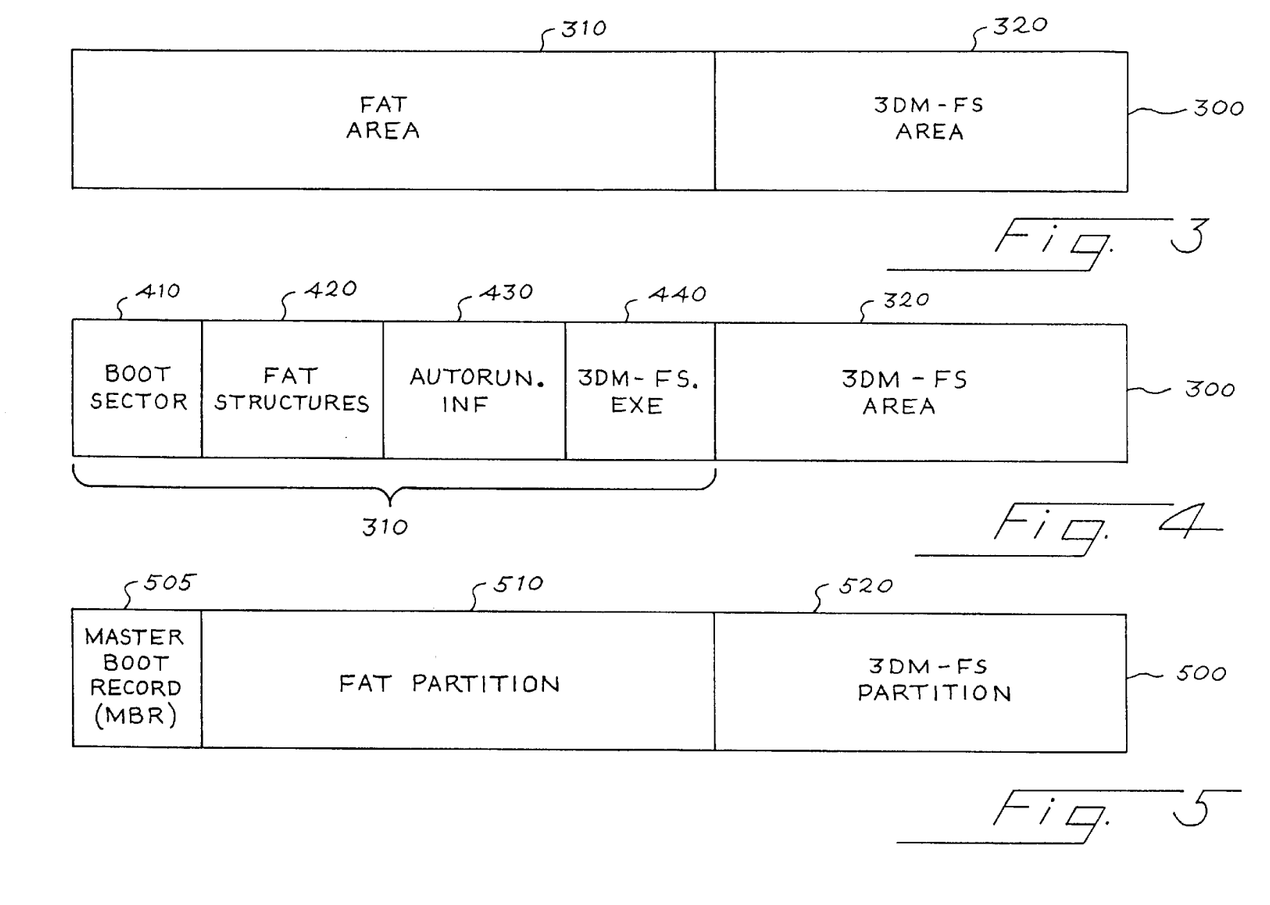
FIG. 3 is an illustration of a memory device of a preferred embodiment having a FAT area and a three-dimensional memory device file system area.
FIG. 4 is an illustration of the FAT area of the memory device of FIG. 3.
FIG. 5 is an illustration of a memory device of a preferred embodiment having a FAT partition and a three-dimensional memory device file system partition.

As shown in FIG. 3, the memory device 300 comprises a FAT area 310 and a three-dimensional memory file system (3DM-FS) area 320. The manufacturer of the memory device 300 can write the FAT files in the FAT area 310 before the memory device 300 is sold to the user. Alternatively, the data storage device that writes 3DM-FS data onto the memory device 300 can also write the FAT files in the FAT area 310.

Preferably, the data storage system writes the FAT files only once—when the user first provides the memory device 300 to the data storage system. As used herein, the term "data storage device" is intended to refer to any device that can store data onto a memory device and can take the same forms as those listed above with respect to a host device (e.g., a digital camera).

FIG. 4 shows the FAT area 310 in more detail. As shown in FIG. 4, the FAT area 310 comprises a boot sector 410, FAT structures 420, program code labeled autorun.inf 430, and program code labeled 3DM-FS.exe 440. In operation, when a user provides the memory device 300 to a host device configured with a DOS FAT file system, the host device recognizes the FAT area and processes the autorun.inf program code. The autorun.inf file causes the 3DM-FS.exe file to run, which installs the 3DM-FS file system on the host device. Alternatively, the 3DM-FS file system can be stored as a separate file within the FAT area 310, and the 3DM-FS.exe program code can cause that separate file to run. With the 3DM-FS file system installed, the 3DM-FS file system makes the data stored in the 3DM-FS area 320 visible to and readable by the host device.

Preferably, the 3DM-FS file system is dynamically and automatically installed on the host device so that the loading of the 3DM-FS file system onto the host device from the memory device 300 is invisible to the user. In one preferred embodiment, the 3DM-FS file system is implemented as kernel-mode code embedded in a virtual device driver (VxD). A VxD is a special type of Windows driver that allows Windows to perform functions that cannot be done by applications communicating with Windows in the normal manner. The IFSMgr function of Windows 95/98/Millennium may support dynamic loading of VxDs. Accordingly, by implementing the 3DM-FS file system as a VxD, the 3DM-FS file system can be dynamically installed on the host device. The advantage to this approach is that the 3DM-FS file system can be used by the host device without rebooting, thereby making the installation of the file system invisible to the user. With this approach, the 3DM-FS file system may only be available for use by the host device until the host device is rebooted or turned off since the 3DM-FS file system is not permanently installed in the host device.

In the example illustrated above, the FAT area 310 and the 3DM-FS area 320 were located in a single partition of the memory device 300. This may present difficulties to host devices that use the volume size information stored in the boot sector 410 because the volume size of the FAT area 310 is different from the volume size of the entire partition. To overcome this problem, it is preferred that the FAT area and the 3DM-FS area be different partitions of the memory device. This implementation is illustrated in FIG. 5. The memory device 500 of FIG. 5 comprises a master boot record (MBR) 505 that describes the memory device as containing two partitions: a FAT partition 510 and a 3DM-FS partition 520.

If the host device is configured with the second file system before the memory device is provided to the host device, such as when the same or another memory device with the program code has been provided to the host device, the second program code can be provided to the host device, and one of the two program codes can turn itself off. Alternatively, the host device can prevent the second program code from being installed. Also, if a host device supports multiple memory devices, it is possible that the multiple memory devices can present file systems with different versions to the host device. For example, two different memory devices can present two different versions of the file system. In this situation, the host device can install both files systems and use the first file system when communicating with the first memory device and the second file system when communicating with the second memory device. Alternatively, the host device can determine which file system is more recent and install the more recent one. If the older file system is already installed on the host device, the host device can swap the older file system with the more recent file system on the fly. Additionally, because the memory device is removable, there can be complications if the operating system of the host device caches data on the memory device. In these situations, it is preferred that the host device periodically check to see if the memory device has been removed and ensure that data stored in the removed memory device is consistent with the cache.

As described above, the first portion of the memory device can be fixed while the second portion of the memory device can be updateable. In this way, program code stored in the fixed first portion can store associated data (e.g., documents, game-state, etc.) in the updateable second portion. Further examples of program code stored in a memory device are described in U.S. patent application serial number 09/775,745 which is assigned to the assignee of the present invention and is hereby incorporated by reference.

As described above, the memory device can take the form of a write-once three-dimensional memory array. U.S. Pat. No. 5,835,396 to Zhang, U.S. Pat. No. 6,034,882 to Johnson, U.S. patent application Ser. No. 09/560,626 to Knall, and U.S. patent application Ser. No. 09/638,428 to Johnson may be taken as examples of three-dimensional memory arrays. Each of these patent documents is hereby incorporated by reference. Further details regarding alternative structures are presented in U.S. patent applications Ser. Nos. 09/638,427 and 09/638,334, both of which are assigned to the assignee of the present application and are hereby incorporated by reference. Although three-dimensional memory arrays can be slower than conventional memory arrays, there are several important memory applications that can easily tolerate a slow access time and derive tremendous benefit from dramatically lower memory cost. Many of these low-speed applications may be collected together under the name "digital media storage." Further, three-dimensional memory arrays provide important economies in terms of reduced size of the memory array and associated reductions in manufacturing cost, which are important in consumer products such as digital cameras, digital audio players, and electronic books.

It should be noted that the preferred embodiments described herein can be practiced with any suitable memory device and that the following claims should not be read as requiring a write-once memory device or a three-dimensional write-once memory device unless specifically recited. It should also be noted that any of the various aspects of any of the preferred embodiments can be used alone or in combination.

Appendices I–III contain code of a preferred embodiment for a dynamically-loaded file system for Windows 95/98/Millenium. This dynamically-loaded file system is built as a Microsoft Windows 95/98/Millenium VxD. It is preferred that a C++ programming package for Microsoft Windows 95/98/Millenium (such as Microsoft Visual C++) and the Microsoft Windows 95 or 98 DDK (Device Driver Kit) be used. The "Matrix file system" that is used by the VxD refers to the file system described in U.S. patent application Ser. No. 09/748,589, which is assigned to the assignee of the present invention and is hereby incorporated by reference. The components of this solution are an "autorun.inf" file that specifies that the Matrix file system loader should run, a loader program that loads the Matrix File System VxD, and the Matrix File System VxD, which is preferably built using the C++ compiler and the DDK. The following source files make up the Matrix file system VxD: "MatrixFS.c," which is the source of the VxD; "MatrixFS_VxDctrl.asm," which is an assembly-language source file that is part of the VxD and is assembled using the Microsoft Macro Assembler (MASM) included with the Windows 95 and 98 DDKs; and "MatrixFS.def," which is a control file for the Microsoft Linker (part of the Microsoft Visual C++ package) that defines some parameters about how the VxD is built.

It is intended that the foregoing detailed description be understood as an illustration of selected forms that the invention can take and not as a definition of the invention. It is only the following claims, including all equivalents, that are intended to define the scope of this invention.

Appendix I

TITLE CONTROL - ControlDispatch for VxD in C

```
        .386p
        .xlist
        include vmm.inc
        include debug.inc
        .list Declare_Virtual_Device MatrixFS, 1, 0, MatrixFS_Control, Undefined_Device_ID, Undefined_Init_Order Begin_Control_Dispatch MatrixFS
    Control_Dispatch W32_DeviceIoControl, _MatrixFS_DeviceIOControl, cCall, <ecx, ebx, edx, esi>
    Control_Dispatch Sys_Dynamic_Device_Init, _MatrixFS_Dynamic_Init, cCall
    Control_Dispatch Sys_Dynamic_Device_Exit, _MatrixFS_Dynamic_Exit, cCall
End_Control_Dispatch MatrixFS end
```

Appendix II

```
;
; Windows 98 Kernel Mode driver definition file for the Matrix File System
;
; Copyright (c) Matrix Semiconductor, 2001

VXD MatrixFS_VxD DYNAMIC

DESCRIPTION 'Matrix File System VxD'

SEGMENTS
        _LTEXT      CLASS 'LCODE'  PRELOAD NONDISCARDABLE
        _LDATA      CLASS 'LCODE'  PRELOAD NONDISCARDABLE
        _TEXT       CLASS 'LCODE'  PRELOAD NONDISCARDABLE
        _DATA       CLASS 'LCODE'  PRELOAD NONDISCARDABLE
        CONST       CLASS 'LCODE'  PRELOAD NONDISCARDABLE
        _BSS    CLASS 'LCODE'   PRELOAD NONDISCARDABLE
        _ITEXT      CLASS 'ICODE'  DISCARDABLE
        _IDATA      CLASS 'ICODE'  DISCARDABLE
EXPORTS
    MatrixFS_DDB @1
```

Appendix III

```
// Windows 98 VxD for the Matrix File System
//
// Copyright (c) Matrix Semiconductor, 2001 define WANTVXDWRAPS include <basedef.h>
include <vmm.h>
#include <debug.h>
#include <vxdwraps.h>
#include <vwin32.h>
#include <winerror.h>
include <configmg.h> include <ifs.h> include "MatrixFS.h"

define FAR

//#include <RegDef.h> include "MatrixFS_IOCtl.h"

typedef DIOCPARAMETERS *LPDIOC;
#define CACHE_BLOCKS 32
define MATRIXFS_MESSAGE_LENGTH 128 pIFSFileHookFunc previous_API_hook_function;
void* Matrix_file_system;
void* Matrix_partition;

// MatrixFS_API_Hook_Function
//
// All IFS functions come through this routine.

#pragma optimize("", off)
int _cdecl MatrixFS_API_Hook_Function(
    pIFSFunc FSD_function,
    int operation,
    int drive,
    int resource,
```

```
                    int code_page,
                    pioreq IO_request
                )
                {
 5                      int status;
                        unsigned char name[MATRIXFS_MESSAGE_LENGTH];
                        long bytes_read;

UniToBCSPath(
10                              name,
                                IO_request->ir_ppath->pp_elements,
                                MATRIXFS_MESSAGE_LENGTH,
                                BCS_WANSI
                        );
15
                        switch(operation)
                        {
                        case IFSFN_OPEN:
                                {
20                                      switch (IO_request->ir_flags & ACCESS_MODE_MASK)
                                        {
                                        case ACCESS_READONLY:
                                                status = MatrixFS_FileOpenRead(
                                                        Matrix_partition,
25                                                      name,
                                                        TRUE,
                                                        IO_request->ir_fh
                                                );
                                                if (status)
30                                                      return ERROR_ACCESS_DENIED;
                                                else
                                                        return ERROR_SUCCESS;

case ACCESS_WRITEONLY:
35                                              status = MatrixFS_FileOpenWrite(
                                                        Matrix_partition,
                                                        name,
                                                        TRUE,
                                                        IO_request->ir_fh
40                                              );
                                                if (status)
                                                        return ERROR_ACCESS_DENIED;
                                                else
                                                        return ERROR_SUCCESS;
45
```

```
                    case ACCESS_READWRITE:
                            // This will be supported in the future revision
                            return ERROR_ACCESS_DENIED;

case ACCESS_EXECUTE:
                            // This will be supported in the future revision
                            return ERROR_ACCESS_DENIED;
                    default:
                            break;
                    } break;
            }
      case IFSFN_READ:
                    status = MatrixFS_Read(
                            IO_request->ir_fh,
                            IO_request->ir_data,
                            IO_request->ir_length,
                            &bytes_read
                    );
                    if (status)
                            return ERROR_ACCESS_DENIED;
                    else
                            return ERROR_SUCCESS;

case IFSFN_WRITE:
                    status = MatrixFS_Write(
                            IO_request->ir_fh,
                            IO_request->ir_data,
                            IO_request->ir_length
                    );
                    if (status)
                            return ERROR_ACCESS_DENIED;
                    else
                            return ERROR_SUCCESS;

case IFSFN_CLOSE:
                    MatrixFS_Close(IO_request->ir_fh);
          return ERROR_SUCCESS;

case IFSFN_DIR:
              {
                    switch(IO_request->ir_flags)
                    {
          case CREATE_DIR:
```

```
                              status = MatrixFS_FolderCreate(
                                      Matrix_partition,
                                      name,
                                      MATRIXFS_ATTRIBUTES_FOLDER
                              );
                              if (status)
                                      return ERROR_ACCESS_DENIED;
                              else
                                      return ERROR_SUCCESS;

case DELETE_DIR:
                              status = MatrixFS_PathDelete(
                                      Matrix_partition,
                                      name
                              );
                              if (status)
                                      return ERROR_ACCESS_DENIED;
                              else
                                      return ERROR_SUCCESS;

case CHECK_DIR:
                              // This will be supported in the future revision
                              return ERROR_ACCESS_DENIED;
                      default:
                         break;
                      }
                              break;
                      }
              case IFSFN_SEEK:
                      // This will be supported in the future revision
                      return ERROR_ACCESS_DENIED;

case IFSFN_COMMIT:
                      // This will be supported in the future revision
                      return ERROR_ACCESS_DENIED;

case IFSFN_FILELOCKS:
                      // This will be supported in the future revision
                      return ERROR_ACCESS_DENIED;

case IFSFN_FINDOPEN:
                      // This will be supported in the future revision
                      return ERROR_ACCESS_DENIED;

case IFSFN_FINDNEXT:
```

```
                    // This will be supported in the future revision
                    return ERROR_ACCESS_DENIED;

case IFSFN_FINDCLOSE:
                    // This will be supported in the future revision
                    return ERROR_ACCESS_DENIED;

case IFSFN_FILEATTRIB:
            {
            switch(IO_request->ir_flags)
                {
                case GET_ATTRIBUTES:
                    {
                            MatrixFS_PathInformation path_information;

status = MatrixFS_PathStatus(
                                    Matrix_partition,
                                    name,
                                    &path_information
                            );

if (status)
                                    return ERROR_ACCESS_DENIED;

IO_request->ir_attr = path_information.attributes;

return ERROR_SUCCESS;
                    }
                case SET_ATTRIBUTES:
                    {
                            status = MatrixFS_PathSetAttributes(
                                    Matrix_partition,
                                    name,
                                    IO_request->ir_attr
                            );

if (status)
                                    return ERROR_ACCESS_DENIED;
                            else
                                    return ERROR_SUCCESS;
                    }
                case GET_ATTRIB_COMP_FILESIZE:
                            // This will be supported in the future revision
                            return ERROR_ACCESS_DENIED;
                case SET_ATTRIB_MODIFY_DATETIME:
```

```
                            // This will be supported in the future revision
                            return ERROR_ACCESS_DENIED;
                    case SET_ATTRIB_LAST_ACCESS_DATETIME:
                            // This will be supported in the future revision
                            return ERROR_ACCESS_DENIED;
                    case GET_ATTRIB_LAST_ACCESS_DATETIME:
                            // This will be supported in the future revision
                            return ERROR_ACCESS_DENIED;
                    case SET_ATTRIB_CREATION_DATETIME:
                            // This will be supported in the future revision
                            return ERROR_ACCESS_DENIED;
                    case GET_ATTRIB_CREATION_DATETIME:
                            // This will be supported in the future revision
                            return ERROR_ACCESS_DENIED;
                    }
                    break;
            }
            case IFSFN_FILETIMES:
            {
                    switch(IO_request->ir_flags)
                    {
                    case GET_MODIFY_DATETIME:
                            // This will be supported in the future revision
                            return ERROR_ACCESS_DENIED;
                    case SET_MODIFY_DATETIME:
                            // This will be supported in the future revision
                            return ERROR_ACCESS_DENIED;
                    case GET_LAST_ACCESS_DATETIME:
                            // This will be supported in the future revision
                            return ERROR_ACCESS_DENIED;
                    case SET_LAST_ACCESS_DATETIME:
                            // This will be supported in the future revision
                            return ERROR_ACCESS_DENIED;
                    case GET_CREATION_DATETIME:
                            // This will be supported in the future revision
                            return ERROR_ACCESS_DENIED;
                    case SET_CREATION_DATETIME:
                            // This will be supported in the future revision
                            return ERROR_ACCESS_DENIED;
                    }
                    break;
            }
            case IFSFN_FLUSH:
                    // This will be supported in the future revision
                    return ERROR_ACCESS_DENIED;
```

19

```
            case IFSFN_DELETE:
                {
                        status = MatrixFS_PathDelete(
                                Matrix_partition,
                                name
                        );
                        if (status)
                                return ERROR_ACCESS_DENIED;
                        else
                                return ERROR_SUCCESS;
                } case IFSFN_SEARCH:
                        // This will be supported in the future revision
                        return ERROR_ACCESS_DENIED;

case IFSFN_GETDISKINFO:
                        // This will be supported in the future revision
                        return ERROR_ACCESS_DENIED;

case IFSFN_RENAME:
                        // This will be supported in the future revision
                        return ERROR_ACCESS_DENIED;
            case IFSFN_IOCTL16DRIVE:
               break;
            }

// Call the previous hooker to the unprocessed functions.

return (*previous_API_hook_function)(
                        FSD_function,
                        operation,
                        drive,
                        resource,
                        code_page,
                        IO_request
                );
        }
        #pragma optimize("", on)

// Function CloseDevice
        //
        // Process the DIOC_CLOSEHANDLE message from the system, posted when
        // CloseHandle() was called.
```

20

```
static DWORD CloseDevice()
{
  return NO_ERROR;
}

// MatrixFS_DeviceIOControl
//
// Handle DeviceIoControl calls.

DWORD MatrixFS_DeviceIOControl(
        DWORD dwService, DWORD dwDDB, DWORD hDevice, LPDIOC
lpDIOCParms)
{
  DWORD dwRetValue = 0;

if (dwService == IOCTL_MATRIX_FS_OPERATION)
        {
                // Perform operation and return any windows error in dwRetValue.
                dwRetValue = NO_ERROR;
        }
        else if (dwService == DIOC_GETVERSION)
        {
                // "Writing Windows VxDs and Device Drivers" p228
                // This message is sent every time CreateFile is called.
                // But no another Sys_Dynamic_Device_Init if the VxD is
                // already loaded.
        }
        else if (dwService == DIOC_OPEN)
        {
                // DIOC_OPEN is sent when VxD is loaded by CreateFile
                // (this happens just after SYS_DYNAMIC_INIT)

}
        else if (dwService == DIOC_CLOSEHANDLE)
        {
                // DIOC_CLOSEHANDLE is sent when VxD is unloaded with CloseHandle
                // (this happens just before SYS_DYNAMIC_EXIT)

dwRetValue = CloseDevice();
        }
        else
        {
          // Returning a positive value will cause the WIN32 DeviceIOControl
```

21

```
            // call to return FALSE. The error code can then be retrieved
            // via the WIN32 GetLastError
                dwRetValue = ERROR_NOT_SUPPORTED;
            } return dwRetValue;
    }

// Function MatrixFS_Dynamic_Init

BOOL MatrixFS_Dynamic_Init()
    {
            int status;
            void* device;
            void* media;

previous_API_hook_function =
                    (void*)
    IFSMgr_InstallFileSystemApiHook(MatrixFS_API_Hook_Function);

status = MatrixFS_Open(&Matrix_file_system);

if (status != MATRIXFS_STATUS_SUCCESS)
                return FALSE;

status = MatrixFS_DeviceOpen(Matrix_file_system, 0, &device);
            if (status != MATRIXFS_STATUS_SUCCESS)
            {
                MatrixFS_Close(Matrix_file_system);
                return FALSE;
            } status = MatrixFS_MediaOpen(device, &media);

if (status != MATRIXFS_STATUS_SUCCESS)
            {
                MatrixFS_Close(Matrix_file_system);
                return FALSE;
            } status = MatrixFS_PartitionOpen(
                media,
                CACHE_BLOCKS,
                "Matrix",
```

```
                MATRIXFS_MESSAGE_LENGTH,
                &Matrix_partition
        );

if (status != MATRIXFS_STATUS_SUCCESS)
        {
                MatrixFS_Close(Matrix_file_system);
                return FALSE;
        } return TRUE;
}

// Function DynamicExit

BOOL MatrixFS_Dynamic_Exit()
{
        MatrixFS_Close(Matrix_file_system);
        IFSMgr_RemoveFileSystemApiHook(MatrixFS_API_Hook_Function);
   return TRUE;
}
```

What is claimed is:

1. A method for reading data stored in a portion of a memory device unreadable by a file system of a host device, the method comprising:

(a) providing a memory device to a host device, wherein the host device comprises a file system installed in the host device prior to the memory device being provided to the host device the memory device comprising a first portion readable by the file system of the host device and a second portion unreadable by the file system of the host device, wherein the first portion stores program code operative to enable the host device to read the second portion;

(b) providing the program code to the host device; and (c) with the host device, reading data stored in the second portion of the memory device.

2. The invention of claim 1, wherein (b) comprises automatically providing the program code to the host device after the memory device is provided to the host device.

3. The invention of claim 1, wherein the memory device and the host device each comprise respective exposed electrical connectors, and wherein (a) comprises connecting the exposed electrical connector of the memory device with the exposed electrical connector of the host device.

4. The invention of claim 1 further comprising removing the memory device from the host device.

5. The invention of claim 1 further comprising, before act (a), providing the program code and the data to the memory device with a data storage device.

6. A memory device comprising:

a connector operative to connect the memory device to a host device, wherein the host device comprises a file system installed in the host device prior to the memory device being connected to the host device;

a first portion readable by the file system of a host device; and a second portion unreadable by the file system of the host device;

wherein the first portion stores program code operative to enable the host device to read the second portion.

7. The invention of claim 1 or 6, wherein the first and second portions are within a single partition of the memory device.

8. The invention of claim 1 or 6, wherein the memory device comprises first and second partitions, and wherein the first partition comprises the first portion and wherein the second partition comprises the second portion.

9. The invention of claim 1 or 6, wherein the first portion is readable by a DOS FAT file system.

10. The invention of claim 1 or 6, wherein the second portion is readable by a file system for a write-once memory device.

11. The invention of claim 1 or 6, wherein the first portion is fixed and wherein the second portion is updateable.

12. The invention of claim 1 or 6, wherein the program code is usable by the host device without rebooting the host device.

13. The invention of claim 1 or 6, wherein the program code is not usable by the host device after the host device is rebooted.

14. The invention of claim 1 or 6, wherein the program code is further operative to enable the host device to write data to the second portion.

15. The invention of claim 1 or 6, wherein the second portion is readable by a second file system and wherein the program code comprises the second file system.

16. The invention of claim 1 or 6, wherein the program code comprises a driver.

17. The invention of claim 1 or 6, wherein the program code comprises an application.

18. The invention of claim 1 or 6, wherein the program code comprises an extension to an application on the host device.

19. The invention of claim 1 or 6, wherein the memory device comprises a three-dimensional memory array.

20. The invention of claim 19, wherein the memory array comprises memory cells of a semiconductor material.

21. The invention of claim 19, wherein the memory array comprises write-once memory cells.

22. A method for reading data stored in a portion of a memory device unreadable by a file system of a host device, the method comprising:

(a) connecting an exposed electrical connector of a memory device with an exposed electrical connector of a data storage device;

(b) with the data storage device, storing program code in a first portion of the memory device and storing data in a second portion of the memory device;

(c) disconnecting the exposed electrical connector of the memory device from the exposed electrical connector of the data storage device;

(d) connecting the exposed electrical connector of the memory device with an exposed electrical connector of a host device, wherein the host device comprises a file system installed in the host device prior to the memory device being connected to the host device, wherein the first portion of the memory device is readable by the file system of the host device and wherein the second portion of the memory device is unreadable by the file system of the host device;

(e) automatically providing the host device with the program code stored in the first portion of the memory device, wherein the program code is operative to enable the host device to read the second portion; and (f) with the host device, reading the data stored in the second portion of the memory device.

* * * * *